(12) United States Patent
Jalali

(10) Patent No.: US 8,750,088 B2
(45) Date of Patent: Jun. 10, 2014

(54) EFFICIENT LAYERED CODING TECHNIQUE TO MITIGATE SHADOWING IN SATELLITE PROPAGATION CHANNEL

(75) Inventor: Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1509 days.

(21) Appl. No.: 11/937,746

(22) Filed: Nov. 9, 2007

(65) Prior Publication Data

US 2008/0115007 A1 May 15, 2008

Related U.S. Application Data

(60) Provisional application No. 60/865,704, filed on Nov. 14, 2006.

(51) Int. Cl.
*H04J 11/00* (2006.01)
*H04L 5/00* (2006.01)
*H04B 7/185* (2006.01)
*H04H 40/90* (2008.01)
*H04L 1/00* (2006.01)
*H04B 7/26* (2006.01)

(52) U.S. Cl.
CPC .......... *H04L 5/0007* (2013.01); *H04B 7/18508* (2013.01); *H04H 40/90* (2013.01); *H04L 2001/0097* (2013.01); *H04B 7/2628* (2013.01); *H04B 2201/709709* (2013.01)
USPC ........... 370/208; 370/315; 370/316; 370/335; 370/342; 370/441; 370/141

(58) Field of Classification Search
None
See application file for complete search history.

(56) References Cited

U.S. PATENT DOCUMENTS 5,442,646 A * 8/1995 Chadwick et al. ............. 714/795
6,876,623 B1 * 4/2005 Lou et al. ...................... 370/208

(Continued)

FOREIGN PATENT DOCUMENTS

EP 1030463 8/2000
WO 2004105337 12/2004

OTHER PUBLICATIONS

TIA/EIA Interim Standard, Mobile Station-Base Station Compatibility Standard for Wideband Spread Spectrum Cellular System. TIA/EIA/IS-95-B, Telecommunications Industry Association, Mar. 1999, Washington, D.C., US (Submitted in 2 parts: Part 1; 70 pages, Part 2; 66 pages).

(Continued)

*Primary Examiner* — Hassan Phillips
*Assistant Examiner* — Mark A Mais
(74) *Attorney, Agent, or Firm* — Jeffrey D. Jacobs

(57) ABSTRACT

An original data stream is encoded into a high priority data stream and a low priority data stream. The high priority data stream is encoded so as to permit decoding of the high priority data steam independently of the low priority data stream. The high priority data stream is transmitted twice, while the low priority data claim 25. is transmitted in two portions, but only once. If both the first portion and the second portion of the low priority data stream are received, and at least one complete transmission of the high priority data stream is received, then the two data streams are combined to produce a signal output of high quality. However, if any portions of the low priority data stream are lost then the low priority data stream is not used, and only the high priority data stream is used to produce output. Overall throughput is greater than would be achieved if the original data stream were transmitted with complete redundancy.

28 Claims, 7 Drawing Sheets

(56) References Cited

U.S. PATENT DOCUMENTS

| | | | | |
|---|---|---|---|---|
| 7,197,685 B2* | 3/2007 | Limberg | ............... | 714/756 |
| 7,215,650 B1* | 5/2007 | Miller et al. | ............... | 370/315 |
| 7,668,257 B2* | 2/2010 | Limberg | ............... | 375/301 |
| 7,796,676 B2* | 9/2010 | Barclay | ............... | 375/141 |
| 8,059,718 B2* | 11/2011 | Choi et al. | ............... | 375/240.12 |
| 2002/0131426 A1* | 9/2002 | Amit et al. | ............... | 370/401 |

OTHER PUBLICATIONS

3rd Generation Partnership Project; Technical Specification Group Radio Access Network; Physical channels and mapping of transport channels onto physical channels (FDD) (Release 7), 3GPP TS 25.211, Mar. 2006, (50 pages).

3rd Generation Partnership Project; Technical Specification Group Radio Access Network; Multiplexing and channel coding (FDD) (Release 7), 3GPP TS 25.212, Sep. 2006. (84 pages).

3rd Generation Partnership Project; Technical Specification Group Radio Access Network; Spreading and modulation (FDD) (Release 7), 3GPP TS 25.213, Mar. 2006, (Submitted in 2 parts: Part 1; 42 pages, Part 2; 42 pages).

3rd Generation Partnership Project; Technical Specification Group Radio Access Network; Physical Layer procedures (FDD) (Release 7), 3GPP TS 25.214, Sep. 2006, (60 pages).

3rd Generation Partnership Project 2 "3GPP 2", Physical Layer Standard for cdma2000 Spread Spectrum Systems, Revision D, Sep. 2004 (538 pages).

TIA/EIA Interim Standard, cdma2000 High Rate Packet Data Air Interface Specification Addendum 1, TIA/EIA/IS-856-1, Telecommunications Industry Association, Jan. 2002, (598 pages).

International Search Report—PCT/US071084651, International Search Authority—European Patent Office, Sep. 15, 2008.

Written Opinion—PCT/US07/084651, International Search Authority—European Patent Office, Sep. 15, 2008.

* cited by examiner

EFFICIENT LAYERED CODING TECHNIQUE TO MITIGATE SHADOWING IN SATELLITE PROPAGATION CHANNEL

CROSS-REFERENCE TO RELATED APPLICATIONS

This application claims the benefit of U.S. Provisional Application No. 60/865,704, filed Nov. 14, 2006. The aforementioned provisional application's disclosure is incorporated herein by reference in its entirety.

BACKGROUND OF THE INVENTION

1. Field of the Invention

The present invention relates generally to communication systems, and more particularly to a method, system, and apparatus for mitigating signal interruptions between a wireless communication device and a source, such as a satellite.

2. Background

Various satellite communication systems have been developed over the years. One early system architecture is referred to as Time Division Multiple Access (TDMA) and is characterized by assignment of time slots in a communication channel to each of a plurality of terminals, and with communication with the terminals taking place in the specifically assigned time slots. An improved system architecture is referred to as Code Division Multiple Access (CDMA). CDMA based communication systems generally provide greater bandwidth efficiency than do TDMA based communication systems.

Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples of cellular-based data systems: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard). The HDR system is implemented in the CDMA communication standard 1xEv-DO.

In general, signal strength is a critical factor in establishing a communication link with good quality of service (QoS). In the case of satellite communications, in which the satellite appears as a point signal source of limited strength to a wireless communication device (WCD), and in which one satellite serves many subscribers across a wide geographic area, a clear line-of-sight between a WCD and a satellite signal source is usually required, and structures between a satellite and a receiver may cause an interruption. Note that this is true not only for satellite communications, but for many other wireless communication forms in which a direct transmission to a receiver is relied upon for signal reception, and in which diffused transmissions or reflections significantly affecting signal path are not generally useful.

There may be many obstacles between a satellite transmitter and a WCD such as a portable communication device, or a satellite radio receiver installed in a car or other vehicle. In satellite broadcast systems, there is typically no feedback mechanism from the receiver back to the satellite to request retransmission of lost packets. In other words, if one specific terminal, such as a receiver on a car, moves under an overpass or behind a building, it will lose packets broadcast from the satellite during the time interval that the car is shadowed by the overpass or the building. This event, called "shadowing" or "blocking", will result in major degradation to the service being received by the mobile ground terminal.

A technique that has been used to mitigate loss of service during shadowing is redundant retransmission of information from the satellite, delayed by a few seconds. Then, if the car happens to enter a shadow and loses the packets for a short period of time, it can wait and try to receive the second copy of the same information that is transmitted a few seconds later. Accordingly, the WCD outputs information with a brief delay. A large drawback to this technique is that the throughput is fully halved because the same data is transmitted twice. With one satellite typically serving multiple subscribers as described above, and with more subscribers daily demanding more streaming video and audio options, increased throughout is highly desirable.

SUMMARY

What is needed is a technique that reduces the loss of throughput due to retransmission of data, while still providing sufficient retransmission of data to mitigate shadowing.

The following terminology will be used throughout the application. Partial signal "redundancy" is achieved by encoding an "original" data stream into at least a "high priority" data stream and a "low priority" data stream. The high priority data stream is encoded and the resulting stream, including the redundant bits, are completely transmitted twice as a "first transmission" and a "second transmission," with an optional delay in between. This ensures that the high priority data stream may be decoded correctly even if one of the transmissions is totally lost. The low priority data stream is encoded also but the low priority data stream is further split into a "first portion" and a "second portion." The two portions of the low priority data stream are transmitted sequentially, with an optional delay in between.

If both the first portion and the second portion of the low priority data stream are received, and at least one complete transmission of the high priority data stream is received, then the two data streams may be decoded to produce both high and low priority data streams to achieve the highest quality. However, if there is a blockage and one of the portions of the low priority data stream is lost then the low priority data stream is not used, and only the high priority data stream is used to produce output. In this case the quality rendered to the user is that of the high priority data stream alone, which is lower than if both high and low priority data streams had been successfully decoded.

Thus, a reliability factor may be provided for the high priority data stream for tolerance of signal interruption of a predetermined duration, corresponding to the duration of one of the transmissions of the first priority stream. As a non-limiting example, a one second portion of the original data stream can be encoded into a high priority data stream and a low priority data stream. The one second of the high priority data stream would be completely transmitted twice. The first portion of the low priority data stream, comprising half the data of the low priority data stream, would be transmitted alongside the first transmission of the high priority data stream. Then, the second portion of the low priority data stream, comprising the other half of the data of the low priority data stream, would be transmitted alongside the second transmission of the high priority data stream.

The first transmission of the high priority data stream may include an error correction code capable of providing decoding of the first transmission, and the second transmission of the high priority data stream may include an error correction code capable of providing decoding of the second transmission.

The first transmission of the high priority data stream may be transmitted on a first logical channel, interleaved with the first portion of the low priority data stream on at least a second logical channel. The second transmission of the high priority data stream may then be redundantly transmitted on the same first logical channel, interleaved with the second portion of the low priority data stream on at least the second logical channel. The high priority data stream may be encoded with error correction coding capable of decoding said high priority data stream absent the low priority data stream. The low priority data stream may be transmitted with error correction coding capable of decoding the low priority data stream at least when combined with the high priority data stream, thereby permitting decoding a combination of the high priority data stream and the low priority data stream when both are received.

The first logical channel may have different signal quality characteristics and different throughput capability than the second logical channel, the signal quality characteristics determined by a signal quality measurement selected from signal to noise ration (SNR), signal to interference ratio (SIR), and signal to interference plus noise ratio (SINR).

As a non-limiting example, the high priority data stream may be encoded using a ½ rate error correction code. The high priority data stream and low priority data streams may each be transmitted using a quadrature amplitude modulation scheme, and may be combined by interleaving symbols of the low priority data stream with symbols of the high priority data stream.

As a further non-limiting example, the high priority data stream may be transmitted using quadrature phase-shift keying (QPSK) or eight phase-shift keying (8PSK) modulating symbols alternating in time, and the low priority data stream may also be transmitted using QPSK or 8PSK modulating symbols alternating in time, and symbols of the two data stream may be interleaved.

As a further non-limiting example, the high and low priority data streams may be modulated using phase shift keyed modulation symbols, such that the low priority data stream's phase shift keyed modulation symbols may be superimposed on a phase shift keyed constellation of the high priority data stream's phase shift keyed modulation symbols.

As a further non-limiting example, the high priority data stream may be provided at a first signal quality value, while the combination of the said low priority data stream and the high priority data stream may be provided at a second, higher signal quality value. In this way, an intermittency of reception less than a tolerance of signal interruption results in reception at the first signal quality value, and uninterrupted reception results in reception at the second signal quality value.

Instructions for performing steps of the above method may be disposed on a machine readable medium. Instructions for performing steps of the above method may also be contained by a processor, provided as a monolithic integrated circuit or as a chipset.

Also, techniques are disclosed for receiving an original data stream, divided according to one of the above methods. The technique includes receiving a first transmission of the high priority data stream, a second transmission of the high priority data stream, or both, and attempting to receive both first and second portions the low priority data stream. If both portions of the low priority data stream are received, then the high priority data stream and the low priority data stream are decoded according to the layered coding scheme and both high priority data and low priority data are presented to upper application layers or generally to produce an output. If a complete transmission of the low priority data stream is not received, then one complete transmission of the high priority data stream is decoded independently of the low priority data stream. Note that if both transmissions of the high priority data stream are received then since both contain the same coded symbols one could soft combine the two received copy in order to further increase the probability of decoding the high priority data stream.

In some embodiments, if any part of the low priority data stream is not received, then the high priority data stream may be decoded independently with the error correction coding provided with the high priority data stream.

Instructions for performing steps of the above method may be disposed on a machine readable medium. Instructions for performing steps of the above method may also be contained by a processor, provided as a monolithic integrated circuit or as a chipset.

Also, an apparatus is disclosed for providing partial signal redundancy in an original data stream divided according to a layered coding scheme into at least a high priority data stream and a low priority data stream. The apparatus includes a layered coding circuit configured to divide the original data stream according to the layered coding scheme and to encode the high priority data stream so as to permit decoding of the high priority data stream independently of the low priority data stream. The apparatus also includes a transmitting circuit. The transmitting circuit is configured to transmit a first transmission of the high priority data stream simultaneously with a first portion of the low priority data stream, and then to transmit a second transmission of the high priority data stream simultaneously with a second portion of the low priority data stream. The transmitting circuit thus provides a reliability factor for the high priority data stream for tolerance of signal interruption of a predetermined duration, corresponding to the duration of one of the transmissions of the first priority stream. As above, the low priority data stream is decoded only if both portions of the lower priority stream are received. Accordingly, if there is a blockage and one of the portions of the low priority data stream is lost then the low priority data stream is lost. In this case the quality rendered to the user is that of the high priority data stream. This quality is lower than if both high and low priority data streams had been successfully decoded.

The apparatus may include an error coding circuit, configured to provide each of the first and second transmissions of the high priority data stream with an error correction code capable of decoding the respective transmission. The apparatus may include a modulator configured to modulate the high and low priority data streams using phase shift keyed modulation symbols, such that the low priority data stream's phase shift keyed modulation symbols may be superimposed on a phase shift keyed constellation of the high priority data stream's phase shift keyed modulation symbols.

Also, an apparatus is disclosed for receiving a transmission of an original data stream encoded according to the layered coding scheme above. The apparatus includes a receiving circuit configured to receive a first transmission of the high priority data stream, a second transmission of the high priority data stream, or both, and to attempt to receive both first and second portions of the low priority data stream. The apparatus includes a decoding circuit configured to decode the high priority data stream and the low priority data stream according to the layered coding scheme if a complete transmission of the low priority data stream is received. The decoding circuit is also configured to decode only one transmission of the high priority data stream, independently of the low priority data stream, if a complete transmission of the low priority data stream is not received. The decoding circuit is further configured to soft combine the two transmissions of the low priority data transmission if both transmissions of the low priority data stream were received, thereby producing an output signal having a predetermined high quality value.

In some embodiments, the apparatus comprises an error correcting circuit configured to decode the combined high and low priority data streams with error correction coding provided with the low priority data stream, if a complete transmission of the low priority data stream was received. The error correcting circuit is further configured to decode one transmission of the high priority data stream with error correction coding provided with the high priority data stream if a complete transmission of the low priority data stream was not received.

Also, a system is disclosed for providing partial signal redundancy. The system includes means for encoding an original data stream into at least a high priority data stream and a low priority data stream, means for duplicating the high priority data stream into a first transmission and a second transmission, means for dividing the low priority data stream into a first portion and second portion, means for encoding the high priority data stream so as to permit decoding of the high priority data steam independently of the low priority data stream, and means for providing a reliability factor for the high priority data stream for tolerance of signal interruption of a predetermined duration, corresponding to the duration of one of the transmissions of the first priority stream.

It should be noted that the original data stream may include video data, audio data, or other data, or combinations thereof.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

Figure 1:
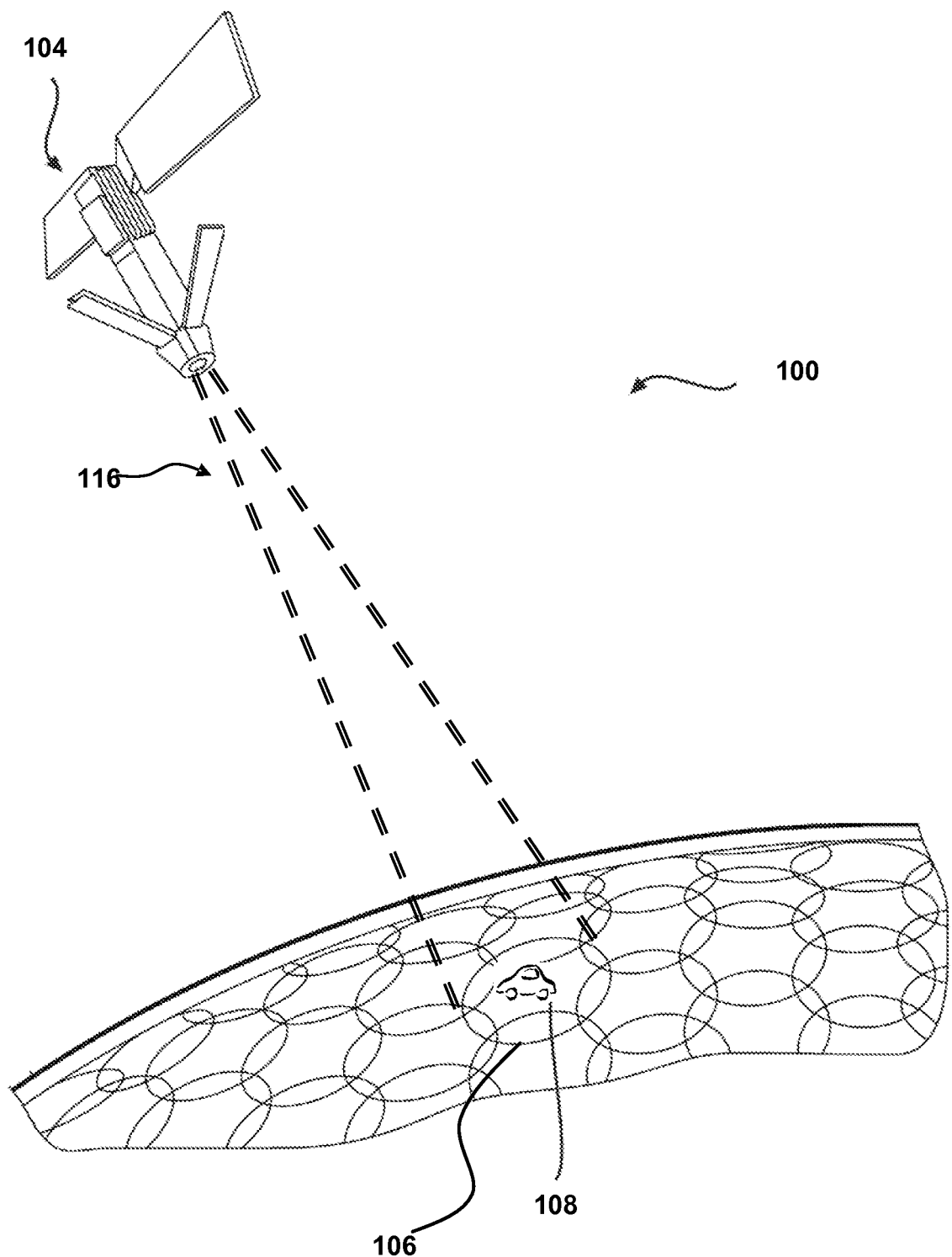
FIG. 1 is a diagram illustrating an operational environment for the present disclosure.

The detailed description set forth below in connection with the appended drawings is intended as a description of examples of aspects and is not intended to represent the only aspects in which the present invention can be practiced. The term "example" where used throughout this description means "serving as an example, instance, or illustration", and should not necessarily be construed as preferred or advantageous over other aspects. All examples are intended to be "non-limiting". The detailed description includes specific details for the purpose of providing a thorough understanding of the present invention; however, it will be apparent to those skilled in the art that the present invention may be practiced without these specific details. In some instances, well known structures and devices are shown in block diagram form in order to avoid obscuring the concepts of the present invention.

Overview

This disclosure describes a technique that reduces the loss of throughput due to retransmission of data. The technique works as follows: the data is transmitted using a layered coding scheme that splits the data to be transmitted into multiple streams, encodes each stream separately with error correction coding, and transmits the different encoded streams on different "virtual channels". The following non-limiting example is given to illustrate the subject matter, and is not meant to limit the scope of the invention as claimed.

A layered coding scheme may be used that divides the data of an original (source) data stream into high priority and low priority data streams. The high priority data stream may be encoded using a rate ½ error correction code and transmitted using QPSK modulation symbols on alternating modulation symbols in time. The low priority data stream may also be encoded using a rate ½ error correction code. But only a first portion of the coded symbols of the low priority data stream are transmitted using QPSK or 8PSK modulation symbols interleaved in time with the QPSK symbols of a first transmission of the complete high priority data stream described above. The remaining second portion of the coded symbols of the low priority data stream are sent during a second transmission of the complete high priority data stream on QPSK or 8PSK symbols interleaved in time with those of the low priority data stream.

The second transmission of the high priority data stream, just like the first transmission of the high priority data stream, contains a complete set of all of the high priority data stream's symbols. In contrast, only a portion of the coded symbols of the low priority data stream are transmitted in each portion. Thus, the high priority data stream's coded data symbols are completely transmitted twice, such that if one but not both of the transmissions is blocked by some shadow, the ground receiver is able to decode the other of the transmissions and receive the high priority data stream. To decode the low priority data stream, for later combination with the high priority data stream, however, the ground receiver needs to receive both portions of the low priority data stream, and use the coded symbols of the complete low priority data stream transmission interleaved with one or the other transmission of the high priority data stream. If only part of the low priority data stream is received, then the low priority data stream may not be decoded. Therefore, in the above two layer transmission scheme, the high priority data stream is decoded even if one of its transmissions is hit by a shadow, and the low priority data stream is decoded only if no portion of it is hit by a shadow.

Therefore, in the above two layer data transmission and the complementing two layer source coding scheme, there is less loss of throughput compared to a non-layered brute force retransmission scheme in which the complete transmission is broadcast twice. Here, in contrast to traditional brute force retransmission schemes, the high priority bits are sent twice, while the low priority bits are sent only once. In this example it is easy to see that there is a 25% saving in transmission rate or 33% increase in throughput, and greater or lesser improvements may be achieved in other configurations.

Throughout this application, reference is made to "high quality" and "low quality" signal reception. These terms are relative, and a "high quality" reception (represented in this application by reception of both the high priority and low priority data streams) need not have an absolute quality value, but merely be of better quality than would occur through reception of the stream corresponding to the low quality signal alone (represented in this application by reception of at least one part of the high priority data stream, and reception of none or part, but not all, of the low priority data stream). As non-limiting examples, the "high quality" and "low quality" receptions may correspond to: an image of higher resolution versus an image of lower resolution, images shown at a higher refresh rate versus images shown at a lower refresh rate, audio of a higher sample rate versus audio of a lower sample rate, audio of lesser lossy compression versus audio of greater lossy compression, audio of wider sample bit depth versus audio of lower sample bit depth, or even reception of a combined video and audio signal versus reception of an audio signal alone. These are merely examples, and one skilled in the art will immediately recognize which elements, absent in a low quality stream, would otherwise make it a high quality stream.

Moreover, throughout this application, reference is made to "high" and "low" priority streams, which are relative terms: the "high priority" stream(s) need not have an absolute priority value, but merely are of higher priority than the low priority data streams.

Note that it is possible to increase the reliability of the high priority data stream by soft combining the same received symbols from the two transmissions. This can result in a 3 dB improvement in the SINR of the received symbols. In that case, if there is some light shadowing (by trees for instance), it may still be possible to decode the high priority data stream and avoid an interruption in service.

Note that it is possible to use a layered coding scheme with three or more streams without departing from the structure described below, with some streams being redundantly broadcast, and the other streams being broadcast once, in multiple portions, as described above. Note too that it is possible to use a layered coding scheme with three or more transmissions of the high priority stream, and division of the low priority stream into a corresponding number of portions.

Operation

FIG. 1 is a diagram illustrating an operational environment for the presently disclosed subject matter. A satellite based wireless communication system 100 may be designed to support one or more communication standards and/or designs (e.g., the CDMA standard, the W-CDMA standard, the IS-95 standard, the CDMA2000 standard, the HDR specification, the 1xEV-DV standard). In an alternative aspect, system 100 may also deploy a wireless standard or design other than a CDMA system. Satellite 104 may be geostationary (in a geosynchronous orbit, or in a fixed position relative to a nonmoving user on the Earth) or may be in a nongeostationary orbit above the Earth. A wireless communication device (WCD), such as a car satellite radio or portable satellite radio or portable telephone 108, is disposed on the Earth in an area 106 serviced by a satellite beam 116. Typically, one beam is assigned to a given geographic area, although in some aspects one area can be serviced by multiple beams, provided by one or more satellites.

The present disclosure makes reference to systems in which satellite communication is effectively unidirectional, e.g., from the satellite 104 to a WCD 108 such as a car satellite radio, or a home satellite radio, or a portable satellite radio, or in which very little bandwidth is needed for whatever "return" communication, if any, is sent from the WCD 108 to the satellite 104. This is only one example, and the layering techniques disclosed herein may be equally useful in systems in which there is equal or greater communication from the WCD 108 to the satellite 104. The present layering techniques are also useful for communication between a WCD 108 and a communication source which may be highly subjected to shadowing (as non-limiting examples, ground-level broadcast sources or moving broadcast sources). The use of a satellite in the present drawings and descriptions, therefore, should be seen as a non-limiting example of a shadowed source whose shadowing may be ameliorated by the disclosed techniques, and not the only source to which these techniques apply.

When the system includes a satellite and a ground-based WCD, shadowing may be caused by trees, bridges, tunnels, overpasses, or other physical blockage of the line of sight from the satellite to the WCD. Shadowing is only one kind of signal blockage which can be ameliorated by the present disclosed techniques. Other signal blockages include signal interference, signal jamming, brief operational failure at a WCD, brief operational failure at a satellite, or signal overlap, even in other wired or wireless systems.

Figure 2:
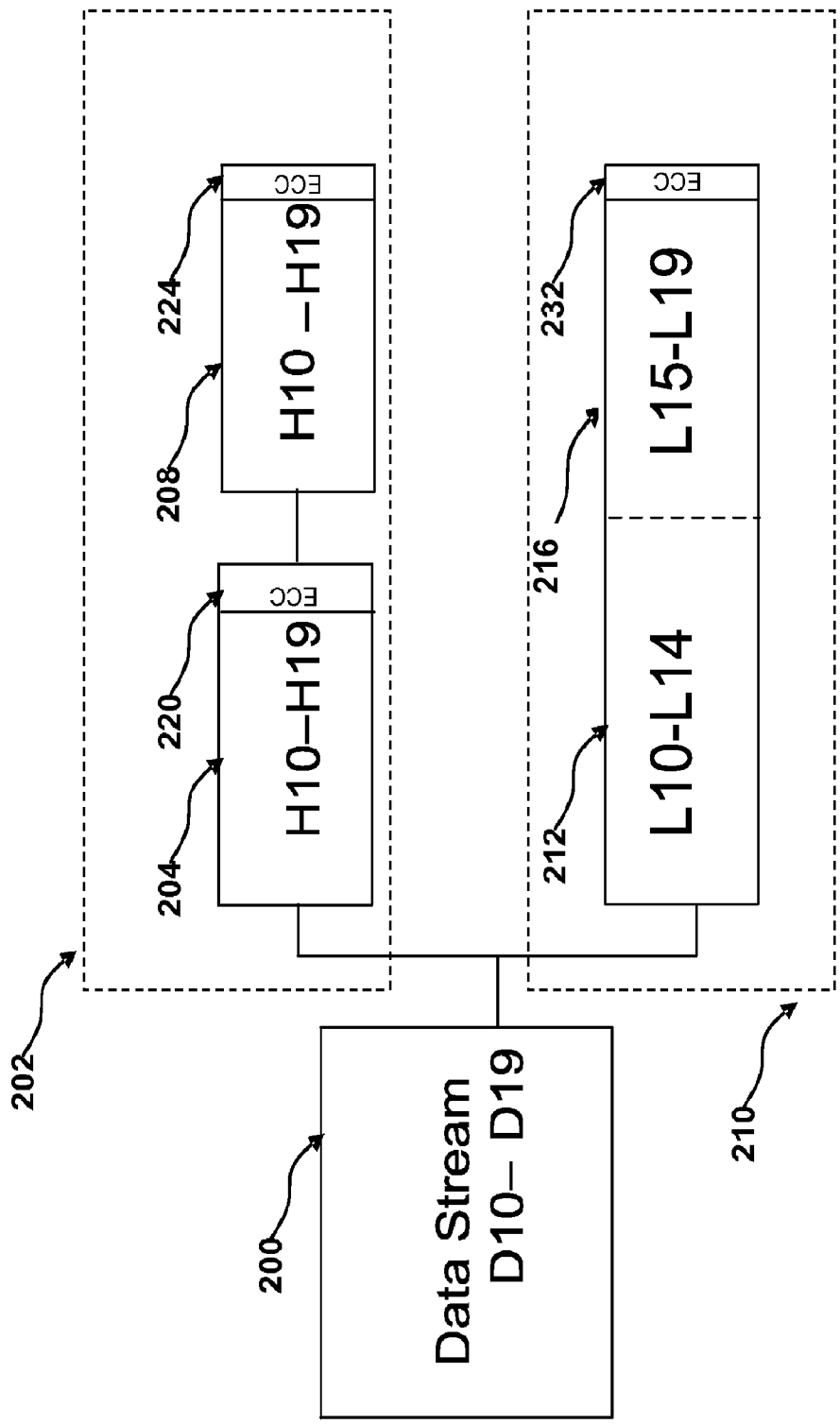
FIG. 2 is a diagram illustrating an aspect of signal redundancy according to the present disclosure.

Making reference to FIG. 2, one aspect of signal redundancy according to the present disclosed subject matter will be illustrated. The technique comprises: encoding an original data stream 200 into at least a high priority data stream 202 and a low priority data stream 210 and encoding the high priority data stream 202 so as to permit decoding of the high priority data steam 202 independently of the low priority data stream 210. The original data stream 200 may comprise audio data, video data, other digital data, stream metadata, or combinations thereof. As shown, the high priority data stream 202 is broadcast in a first transmission 204, and then subsequently rebroadcast in a second transmission 208. In the span of time over which the content of the high priority data stream 202 is broadcast twice (204, 208) the low priority data stream 210 is broadcast once (divided between first portion 212 and second portion 216, with no redundancy between). The numbers 10-19 are used to represent the tenth through nineteenth elements of a broadcast, such as, in a non-limiting example, the tenth through the nineteenth seconds of audio to be played. Accordingly, the high priority data stream's elements 10 through 19 are broadcast twice (as a first transmission and then as a second transmission) in the time it takes for the low priority data stream's elements 10 through 19 to be broadcast once. This is only one example, and the designations 10-19 may also refer to the tenth through nineteenth packets of digital data to be sent. Under such representations, it is clear that element D10 of the original data stream, for example, is split according to a layered coding scheme, and then broadcast twice in the high priority data stream 202 as represented by element H10, but only once in the low priority data stream 210 as represented by element L10.

The contents of the high priority data stream 202 are broadcast with a time diversity between instances 204, 208. By broadcasting the contents of the high priority data stream 202 twice (as first transmission 204 and second transmission 208), a reliability factor is achieved for the high priority data stream 202 for tolerance of signal interruption of a predetermined duration. This duration for which a reliability factor is provided corresponds approximately to the duration of time encoded in the duplicate-broadcast signal. As a non-limiting example, if data corresponding to twenty seconds worth of audio are broadcast on the high priority data stream in the course of ten seconds (for example, as first transmission 204), and are then subsequently rebroadcast in the course of ten more seconds as a time-delayed repetition (for example, as second transmission 208), the broadcast can tolerate signal interruptions of up to ten seconds in duration without loss of reception of the high priority data stream 202. Under such an interruption, only the high priority data stream 202 would be decoded, and the ultimate output quality value would correspond to the data density of one transmission of the high priority data stream 202 alone. In contrast, when no such interruption occurs, decoding of the low priority data stream 210 together with the high priority data stream 202 provides an output signal having a quality value better than if the high priority data stream were decoded alone.

In FIG. 2, the designation H is applied to the packets of the high priority data stream 202 because this stream may be provided as a "high priority" stream. Similarly, the designation L is applied to packets of the low priority data stream 210, because this stream may be provided as a "low priority" stream.

Error correction coding may be applied to the high priority data stream 202 and low priority data stream 210 in a number of different ways. As the high priority data stream 202 is intended to be decodable independent of the low priority data stream 210, its error correction codes (220, 224) should not depend on reception of the low priority data stream 210. Moreover, as both the first transmission 204 and second transmission 208 of the high priority data stream 202 should be independently decodable, first transmission 204 of the high priority data stream 202 may include an error correction code 220 capable of providing decoding of the first transmission 204, and second transmission 208 of the high priority data stream 202 may include an error correction code 224 capable of providing decoding of the second transmission 208.

(Optionally, as first transmission 204 and second transmission 208 are essentially identical, so too may their error codes be essentially identical, and second transmission error code 224 may be capable of decoding either of first transmission 204 or second transmission 208, and similarly, transmission error code 220 may be capable of decoding either first transmission 204 or second transmission 208. In this way, successful reception of either error code 220, 224 could be sufficient to decode either of first transmission 204 or second transmission 208 of the high priority data stream 202, which would be beneficial if, say, the first transmission 204 and the error code of the second transmission 224 are received, but shadowing causes the loss of the error correction code 220 and the content of the second transmission 208.) The low priority data stream 210 is also provided as decodable independent of the high priority data stream 202, with error code 232.

The high priority data stream 202 and low priority data stream 210 may be provided at different proportional data rates. The choice of data rates will depend on the available bandwidth, and on the priorities of the broadcast. As a non-limiting example, when high output quality is important and bandwidth is available, more bandwidth can be devoted to the high priority data stream, so that even the high priority data is at high quality.

The high priority data stream 202 and the low priority data stream 210 may be transmitted on different logical channels. The first transmission 204 of the high priority data stream 202 may be transmitted on a first logical channel interleaved with a first portion 212 of the low priority data stream 210 on a second logical channel. The second transmission 208 of the high priority data stream 202 may be transmitted on the same first logical channel, interleaved with the second portion 216 of the low priority data stream 210 on the same second logical channel. The high priority data stream 202 may be encoded with error codes 220, 224 such as a ½ rate error correction code, although many other error correction codes may be used.

Although many modulation schemes may be used with the present disclosure, one way to accomplish the above interleaving across multiple logical channels is to transmit the high priority data stream 202 and low priority data stream 210 using a quadrature amplitude modulation scheme, combined by interleaving symbols of the low priority data stream 210 with symbols of the high priority data stream 202. Alternatively, quadrature phase shift keying may be used to transmit the data streams, and as a non-limiting example, the high priority data stream may be transmitted using quadrature phase-shift keying (QPSK) or eight phase-shift keying (8PSK) modulating symbols alternating in time, and the low priority data stream may be transmitted using QPSK or 8PSK modulating symbols alternating in time, by interleaving symbols of the low priority data stream with symbols of the high priority data stream. More generally, the high priority data stream 202 may be modulated using phase shift keyed modulation symbols of a chosen kind; and the low priority data stream 210 may be modulated using phase shift keyed modulation symbols of a corresponding kind, superimposed on the phase shift keyed constellation of the high priority data stream's phase shift keyed modulation symbols. These are however merely examples, and again, many known schemes and numbers of logical channels, whether multiplexed by frequency, time, code, or phase, may be utilized.

When choosing logical channels, the first logical channel may have different signal quality characteristics and different throughput capability than the second logical channel, where the signal quality characteristics are determined by a signal quality measurement such as signal to noise ration (SNR), signal to interference ratio (SIR), or signal to interference plus noise ratio (SINR). These different signal quality characteristics can correspond to the different content and/or bandwidth desired for the high priority data stream 202 and the low priority data stream 210.

In FIG. 2, elements 10 through 14 of the low priority data stream 212 are broadcast in the same time it takes to broadcast the first transmission 204 of elements 10 through 19 of the high priority data stream, and elements 15 through 19 of the low priority data stream 216 are broadcast in the same time it takes to broadcast the second transmission of elements 10 through 19 of the high priority data stream 208. Elements 10 through 19 (212) of the low priority data stream (210) are encoded together, so that a single error correction code 232 need be provided. Encoding all elements of the low priority stream with a single error code it has the benefit of preserving bandwidth. Note that the elements of the high priority stream (for example, element 10) are broadcast twice in the high priority data stream 202, but only once in the low priority data stream 210.

Instructions for performing the method as set forth above may be disposed on a machine readable medium, or may be contained in a processor provided as a monolithic integrated circuit or as a chipset.

Figure 3:
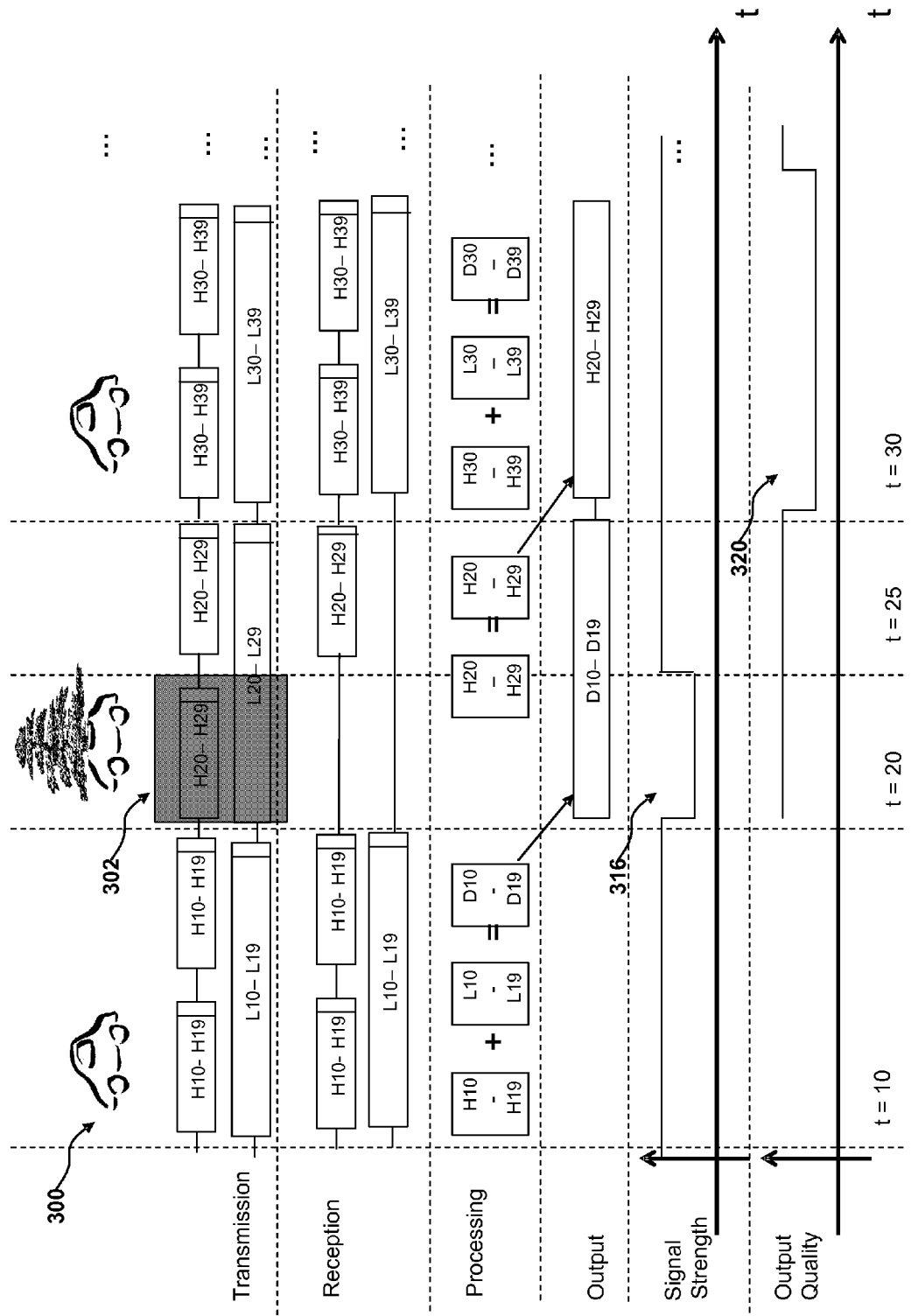
FIG. 3 is a diagram illustrating the utilization of signal redundancy during shadowing according to the present disclosed subject matter.

FIG. 3 is a graphic illustration of the utilization of signal redundancy during shadowing according to the present disclosure, and also illustrates the process of receiving a signal transmitted according to the disclosed techniques and using the disclosed novel redundancies. The signal being transmitted is illustrated in a manner similar to that shown in FIG. 2, in which a high priority signal is interleaved with a low priority signal, and in which the first portion of the low priority signal elements is not necessarily decodable independent of the second portion of the low priority signal elements. Here, as time progresses from the left of the figure to the right of the figure, a vehicle 300 containing a WCD travels past a tree which shadows a portion of the transmission coming from a satellite (not shown). The WCD receives the original data stream (again, elements D10-D39) divided according to a layered coding scheme into a high priority data stream (elements H10-H39) and a low priority data stream (elements L10-L39). Each part of the high priority data stream is transmitted twice, thereby providing a reliability factor for the high priority data stream for tolerance of signal interruption of a predetermined duration. The WCD receives either the first transmission of the high priority data stream, the second transmission of the high priority data stream, or both, and also attempts to receive a complete transmission of the low priority data stream. If a complete transmission of the low priority data stream is received, the high priority data stream and the low priority data stream are both decoded and utilized for an output having a predetermined high quality value. If a complete transmission of the low priority data stream is not received, the high priority data stream is decoded alone and an output is produced from the decoded high priority data stream having a lower quality value.

In detail:

From time t=10 to t=19, elements H10-H19 are transmitted and received twice, while elements L10-L19 are only transmitted and received once. As both the high priority and low priority data streams are received, they are recombined into the original data stream (elements D10-D19). As no shadowing occurs, the signal strength received 408 is high. No output occurs during this time 412 because the signals received are output on a ten second time delay. That is, signals received from time t=10 to time t=19 will be output during time t=20 to time t=29.

From time t=20 to t=24, shadowing 302 occurs, and although transmitted, neither the first transmission of the high priority data stream (H20-H29) nor the first portion of the low priority data stream (L20-L24) are received. Accordingly, the signal strength is very low (as shown by dip 316). After the shadowing, from time t=25 to t=29, the WCD is able to pick up the complete second transmission of the high priority data stream. Since the first portion of the low priority data stream was not received, no decoding of the low priority data stream is attempted at all, no attempt need to be made to receive the second portion of the low priority data stream. During this time, output quality remains high, because the output being reproduced (corresponding to D10-D19, which was reconstructed in full) was received during the previous ten seconds.

From time t=30 to t=39, no shadowing occurs, signal strength is high, and the WCD is able to receive both the first transmission and the second transmission of high priority stream elements H30-H39, as well as both portions of low priority stream elements L30-L39, and decode these signals back into original data stream elements D30-D39. Because of the previous shadowing, however, only elements H20-H29 are output (due to the ten second delay). While output is uninterrupted, quality drops (as shown by dip 320) to a low quality, proportional to the data rate of the high priority data stream alone.

At time t=40, not shown, audio output will return to high quality, as elements D30-D39 begin to be produced again.

Instructions for performing the reception technique as set forth above may be disposed on a machine readable medium, or may be contained in a processor provided as a monolithic integrated circuit or as a chipset.

Figure 4:
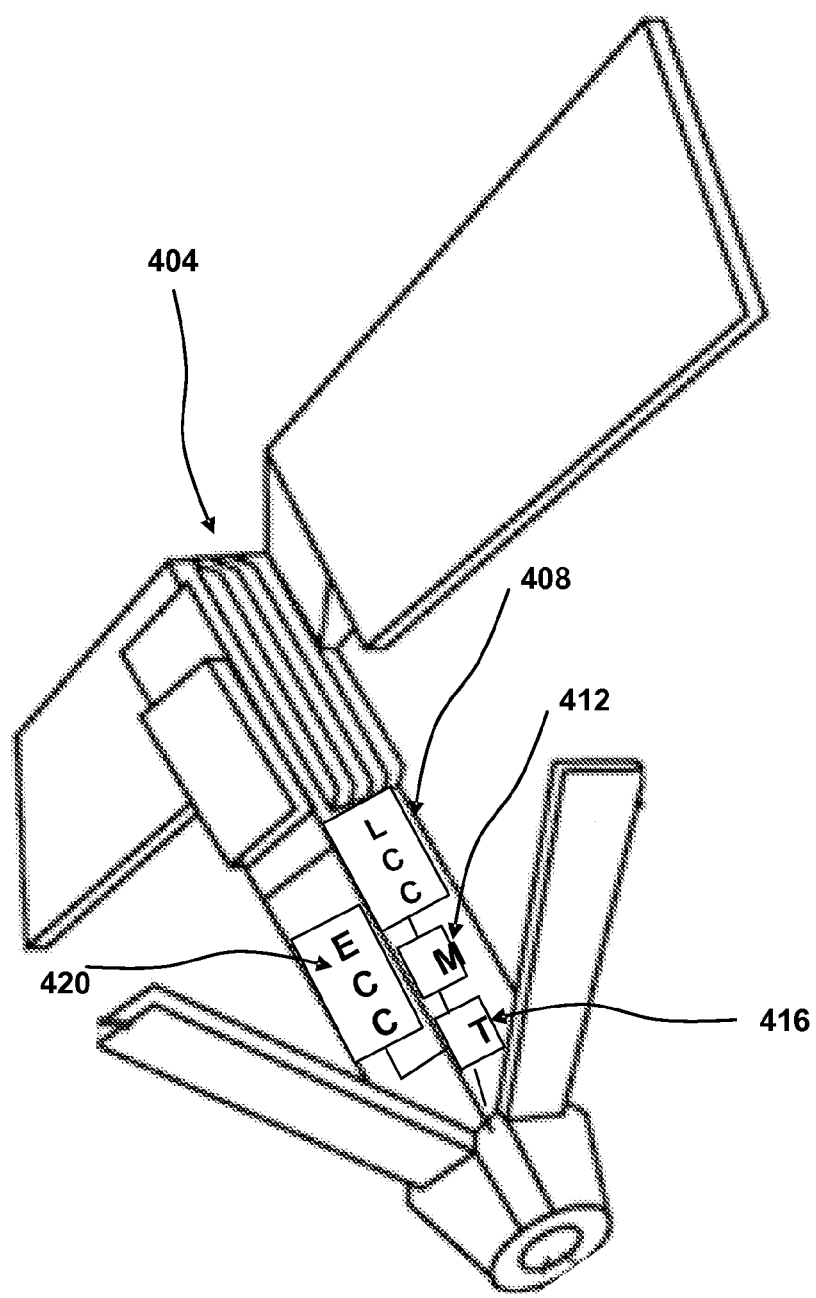
FIG. 4 is a drawing of a satellite configured for transmissions with signal redundancy according to the present disclosure.

FIG. 4 illustrates a satellite 404 configured for transmissions with signal redundancy according to the present disclosure. Although a satellite is chosen to illustrate a transmitter for the disclosed technique, in keeping with the previous illustrations, this is not meant to limit the scope of the invention as claimed. Many other transmitters whose receivers are susceptible to shadowing can be configured to operate according to the disclosed technique, including radio transmitters, and other moving and still wireless signal sources. Even wired signal sources susceptible to high interference can use the disclosed techniques. The following description is generally relevant for an apparatus to be used for providing partial signal redundancy in a transmission of an original data stream divided according to a layered coding scheme into at least a high priority data stream and a low priority data stream.

The satellite 404 includes a layered coding circuit 408 layered coding circuit configured to divide the original data stream according to the layered coding scheme and to encode the high priority data stream so as to permit decoding of the high priority data stream independently of the low priority data stream. Although illustrated as a single element, it should be noted that separate encoding and dividing circuits may also be used. This coding circuit, along with or independent from the other circuits described herein, may be disposed as a processor. The satellite 404 also includes a transmitting circuit 416 configured to transmit a first transmission of the high priority data stream simultaneously with a first portion of the low priority data stream, and then to transmit a second transmission of the high priority data stream simultaneously with a second portion of the low priority data stream. The transmitting circuit thus provides a reliability factor for the high priority data stream for tolerance of signal interruption of a predetermined duration, corresponding to the duration of one of the transmissions of the first priority stream. As above, the low priority data stream is decoded only if both portions of the lower priority stream are received. Accordingly, if there is a blockage and one of the portions of the low priority data stream is lost then the low priority data stream is lost. In this case the quality rendered to the user is that of the high priority data stream. This quality is lower than if both high and low priority data streams had been successfully decoded.

The satellite 404 may include an error coding circuit 520 configured to provide each of the first and second transmissions of the high priority data stream with an error correction code capable of decoding the respective transmission. The satellite 404 may include a modulator 412 disposed between the coding circuit and transmitting circuit, although other configurations may be used, configured to modulate the high and low priority data streams using phase shift keyed modulation symbols, such that the low priority data stream's phase shift keyed modulation symbols may be superimposed on a phase shift keyed constellation of the high priority data stream's phase shift keyed modulation symbols. Although illustrated as a single element, the modulator 412 may alternatively be part of the layered coding circuit 408, the transmitting circuit 416, or the error coding circuit 420. Again, this is only one modulation scheme, and others may be used as set forth above.

Numerous "systems" may be formed according to the instructions herein for providing partial signal redundancy. A system may include means for encoding an original data stream into at least a high priority data stream and a low priority data stream (such as LCC 408), means for encoding the high priority data stream so as to permit decoding of the high priority data steam independently of the low priority data stream (such as LCC 408), and means for providing a reliability factor for the high priority data stream for tolerance of signal interruption of a predetermined duration (such as LCC 408). These systems may also include means for providing transmissions interleaved on logical channels (such as LCC 408 and transmission circuit 416), means for encoding portions of the high priority data stream and the low priority data stream (error coding circuit 420), means for providing the high priority and combined data streams at different signal quality values (such as LCC 408), means for modulating the data streams using phase shift keyed modulation symbols (such as LCC 408 and/or transmitting circuit 416), and means for transmitting the data streams (such as transmitting circuit 416)

Figure 5:
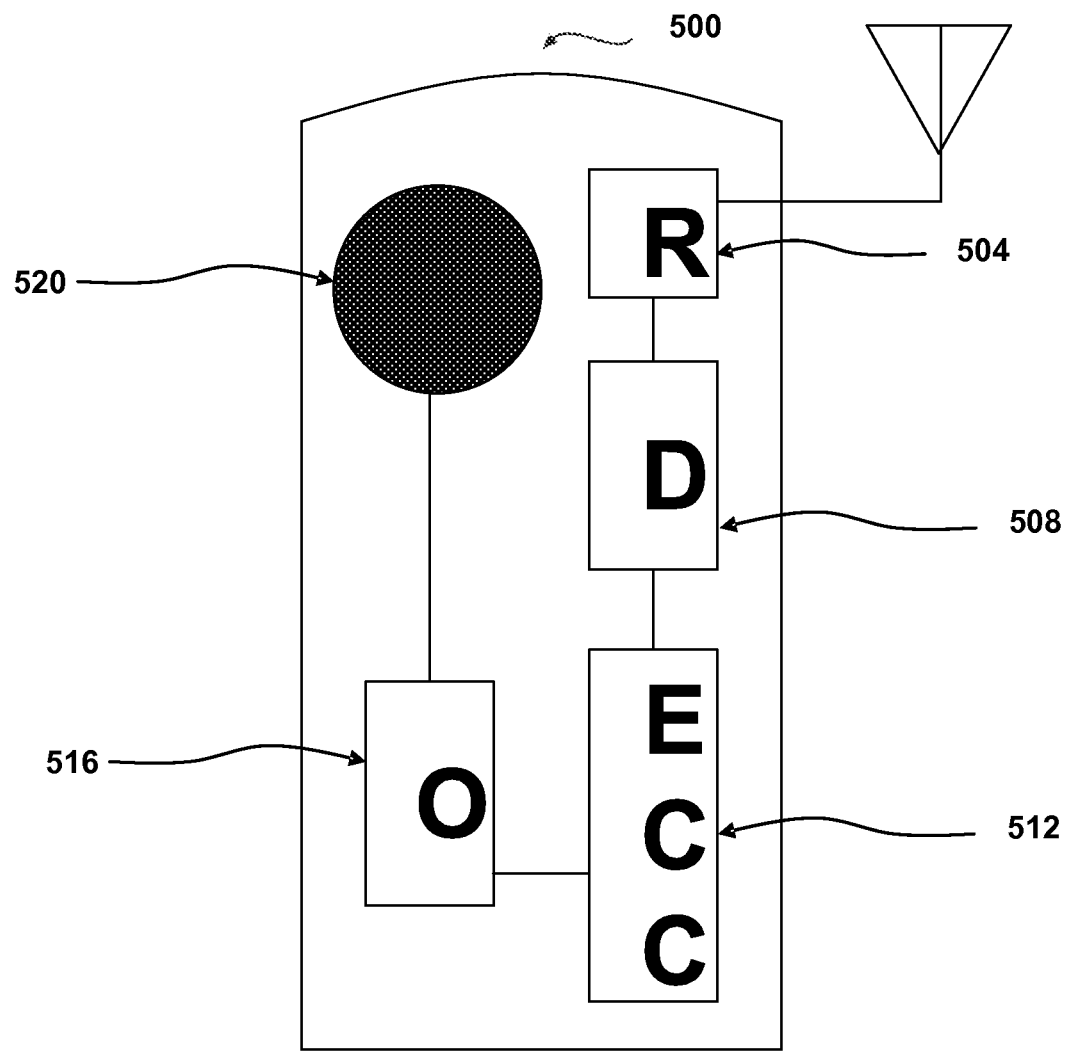
FIG. 5 is a drawing of a wireless communication device configured for transmissions with signal redundancy according to the present disclosure.

FIG. 5 illustrates a WCD 500 configured for transmissions with signal redundancy according to the present disclosed subject matter. As discussed above, this WCD 500 may be a device used in wireless or wired communication in which shadowing or interference is of concern, and the chosen illustration is not meant to limit the types of receiving devices with which this technique may be implemented.

The WCD 500 receives a transmission of an original data stream divided according to a layered coding scheme into a high priority data stream and a low priority data stream. The WCD 500 includes a receiving circuit 504 configured to receive a first transmission of the high priority data stream, a second transmission of the high priority data stream, or both, and to attempt to receive both first and second portions the low priority data stream. The WCD 500 further includes a decoding circuit 508 configured to decode the high priority data stream and the low priority data stream according to the layered coding scheme if a complete transmission of the low priority data stream is received. The decoding circuit is also configured to decode only one transmission of the high priority data stream, independently of the low priority data stream, if a complete transmission of the low priority data stream is not received. If a transmission of the high priority data stream is decoded independently, the output signal produced from the decoded transmission of the high priority data stream will have a quality value lower than the predetermined high quality value. This decoding circuit, along with or independent from the other circuits described herein, may be disposed as a processor.

The WCD 500 further includes an output circuit 516 configured to produce audio output of the output signal. The output circuit 516 may produce audio output at, for example, speaker 520, but may also produce video output, digital textual output, or another kind of output. The WCD 500 may include an error correcting circuit 512, configured to decode the combined high and low priority data streams with error correction coding provided with the low priority data stream, if a complete transmission of the low priority data stream was received. The error correcting circuit is further configured to decode one transmission of the high priority data stream with error correction coding provided with the high priority data stream if a complete transmission of the low priority data stream was not received.

Numerous "systems" for receiving at least part of an original data stream may be formed according to the present disclosure, where the original data stream has been divided according to a layered coding scheme into at least a high priority data stream and at least a low priority data stream, and the high priority data stream has been transmitted as a first transmission and as a second transmission, thereby providing a reliability factor for the high priority data stream for tolerance of signal interruption of a predetermined duration. These systems may include means for receiving at least one of a first transmission of the high priority data stream and a second transmission of the high priority data stream (such as 504), means for attempting to receive a complete transmission of the low priority data stream (such as 504); means for decoding the high priority data stream and the low priority data stream according to the layered coding scheme to produce an output signal having a predetermined high quality value if a complete transmission of the low priority data stream is received (such as 608), and means for decoding the high priority data stream and producing an output signal from the decoded high priority data stream having a quality value lower than the predetermined high quality value if a complete transmission of the low priority data stream is not received (such as 608). These systems may also include means for decoding the low priority data stream with error correction coding provided with the low priority data stream if a complete transmission of the low priority data stream is received (such as 612); and means for decoding the high priority data stream with error correction coding provided with the high priority data stream if a complete transmission of the high priority data stream is received (such as 612).

Figure 6:
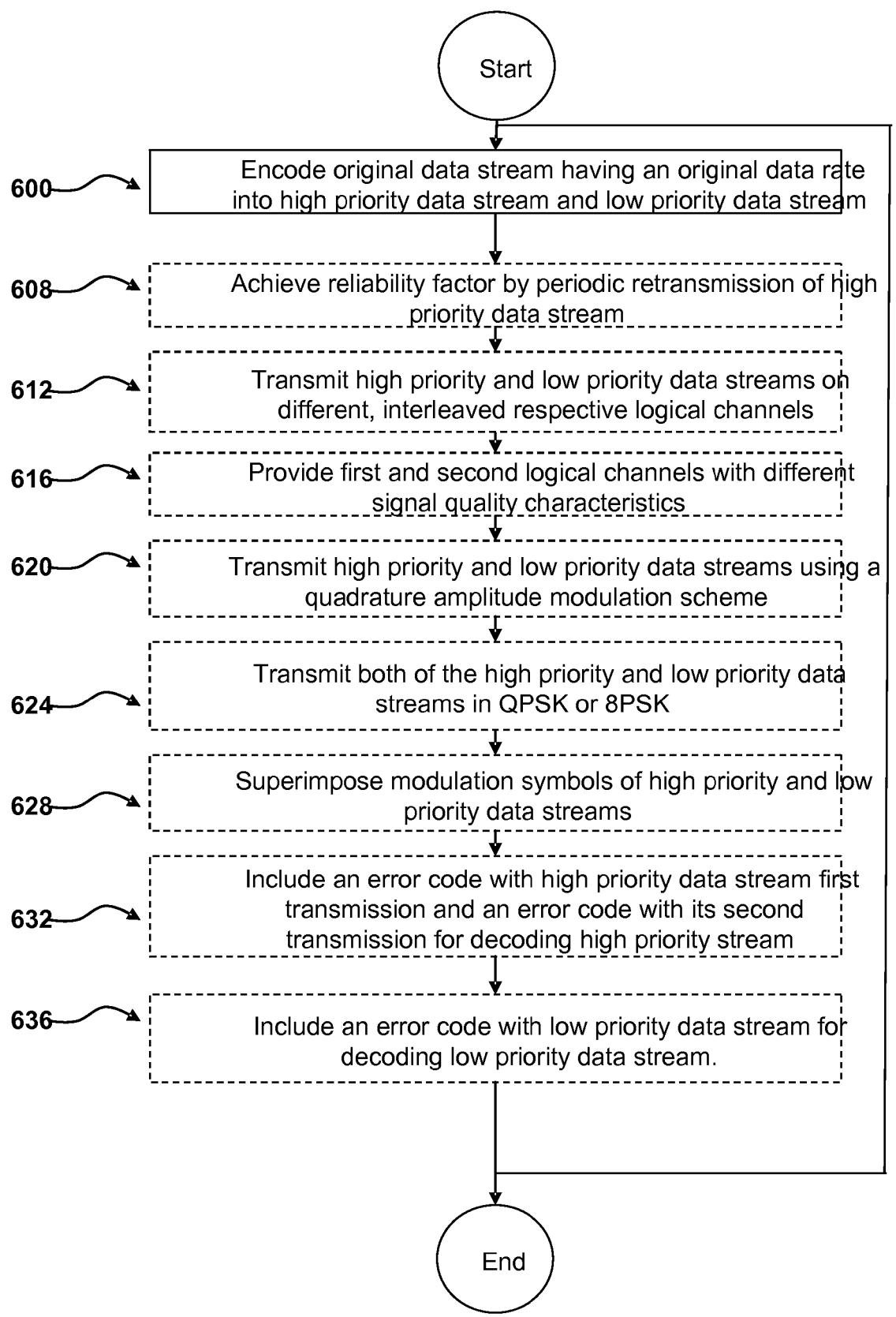
FIG. 6 is a chart illustrating a method for transmitting a signal encoded with signal redundancy according to the present disclosure.

FIG. 6 charts a method for transmitting a signal encoded with signal redundancy according to the present disclosed subject matter. The method has largely been described above with reference to FIGS. 1-65. The method includes, at step 600, encoding an original data stream into at least a high priority data stream and a low priority data stream. At step 604, a reliability factor may be achieved for the high priority data stream by, for example, broadcasting the contents of the high priority data stream twice (step 608).

The high priority and low priority data streams may be transmitted on different, interleaved logical channels (step 612). These channels may optionally have different signal quality characteristics (step 616), although this is not required. As an example, the high priority and low priority data streams may be transmitted using combinations of QPSK and 8PSK (steps 620, 624), and the modulation symbols of the high priority and low priority data streams may be superimposed (step 628). Error coding, as described above, may be provided separately with the high priority data stream (step 632) and the low priority data stream (step 636), and the coding of the low priority data stream may optionally require reception of both the high priority and low priority data streams for decoding. The process may repeat as long as reception is desired and transmission is occurring. The above order of steps is a non-limiting example; other orders may be used, and some steps are optional.

Figure 7:
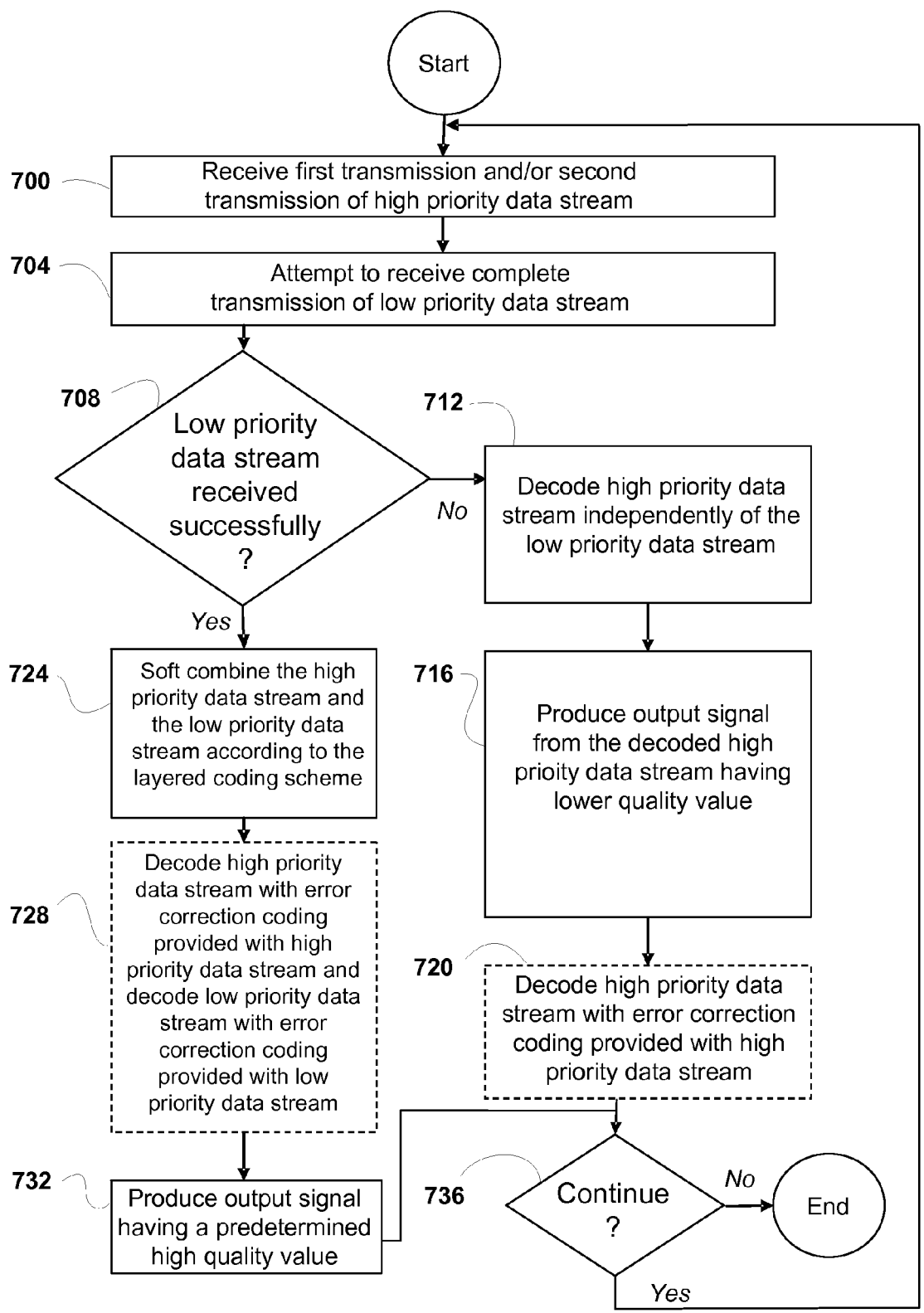
FIG. 7 is a chart illustrating a method for receiving a signal encoded with signal redundancy according to the present disclosure.

FIG. 7 charts a method for receiving a signal encoded with signal redundancy according to the present disclosed subject matter. The method has largely been described above with reference to FIGS. 1-5. The method includes receiving one or both of the first transmission and second transmission of the high priority data stream (step 700), and then attempting to receive a complete transmission of both portions of the low priority data stream (step 704). If both portions of the low priority data stream are received successfully (YES at step 708), then the data streams are combined according to a layered coding scheme (step 724), and an output signal is produced having a predetermined high quality value (step 732). Optionally, error coding provided with the low priority data stream may be used (step 728) to decode both the high priority and low priority data streams, although error coding may be provided and applied separately for each stream, or exclusively with the high priority stream.

In contrast, if the low priority data stream is not received successfully (NO at step 808), then the high priority data stream is decoded independently (step 712) and an output signal is produced (step 716) having a lower signal quality value. Error coding provided with the high priority data stream may be used (step 720) to decode the high priority data stream alone.

The process may repeat (step 736) as long as reception is desired and transmission is occurring. The above order of steps is a non-limiting example; other orders may be used, and some steps are optional.

Conclusion

Those of skill in the art will understand that information and signals may be represented using one or more of a variety of different technologies and techniques. For example, data, instructions, commands, information, signals, bits, symbols, and chips which may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. "Storage medium" may represent one or more machine readable mediums or devices for storing information. The term "machine readable medium" includes, but is not limited to, wireless channels and various other mediums capable of storing, containing, or carrying instructions and/or data.

The previous description of some aspects is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. Further, one or more of the aspects can be implemented by hardware, software, firmware, middleware, microcode, or any combination thereof. Thus, the present invention is not intended to be limited to the aspects shown herein but is to be accorded the widest scope consistent with the principles and novel features disclosed herein, including the appended claims.

The invention claimed is:

1. A method for providing partial signal redundancy, the method comprising:
   encoding an original data stream into at least a high priority data stream and a low priority data stream and encoding the high priority data stream so as to permit decoding of the high priority data steam independently of the low priority data stream; and
   providing a reliability factor for the high priority data stream for tolerance of signal interruption of a predetermined duration by:
      broadcasting a first transmission of the high priority data stream over a first virtual channel of a communication source and then rebroadcasting a second transmission of the high priority data stream over the first virtual channel, and
      simultaneously broadcasting the low priority data stream over a second virtual channel while the first and second transmissions of the high priority data stream are broadcast over the first virtual channel separate from the second virtual channel of the communication source.

2. The method of claim 1, wherein at least one of the first and second transmissions of the high priority data stream includes an error correction code capable of providing decoding of the respective transmission.

3. The method of claim 1, comprising:
   broadcasting the first transmission of said high priority data stream on at least the first virtual channel interleaved with a first portion of said low priority data stream on at least the second virtual channel; and
   subsequently broadcasting a second transmission of said high priority data stream on at least said first virtual channel interleaved with a second portion of said low priority data stream on at least-said second virtual channel.

4. The method of claim 3, comprising said first virtual channel having different signal quality characteristics and different throughput capability than said second virtual channel, said signal quality characteristics determined by a signal quality measurement selected from signal to noise ratio (SNR), signal to interference ratio (SIR), and signal to interference plus noise ratio (SINR).

5. The method of claim 1, the method further comprising: encoding said high priority data stream with error correction coding capable of rendering an output from the high priority data stream thereby permitting decoding said high priority data stream absent the low priority data stream.

6. The method of claim 1, the method further comprising: encoding said low priority data stream with error correction coding capable of rendering an output from the low priority data stream thereby permitting decoding said low priority data stream absent the high priority data stream.

7. The method of claim 1, comprising said high priority data stream encoded using a ½ rate error correction code.

8. The method of claim 1, comprising transmitting said high priority data stream as the first transmission and the second transmission using a quadrature amplitude modulation scheme and transmitting said low priority data stream as a first portion and a second portion using a quadrature amplitude modulation scheme, combined by interleaving symbols of said first portion of said low priority data stream with symbols of said first transmission of said high priority data stream, and interleaving symbols of said second portion of said low priority data stream with symbols of said second transmission of said high priority data stream.

9. The method of claim 1, comprising transmitting said high priority data stream as the first transmission and the second transmission using at least one of quadrature phase-shift keying (QPSK) and eight phase-shift keying (8PSK) modulating symbols alternating in time, and transmitting said low priority data stream as a first portion and a second portion using at least one of QPSK and 8PSK modulating symbols alternating in time, combined by interleaving symbols of said first portion of said low priority data stream with symbols of said first transmission of said high priority data stream, and interleaving symbols of said second portion of said low priority data stream with symbols of said second transmission of said high priority data stream.

10. The method of claim 1, wherein said original data stream includes at least one of video data and audio data.

11. The method of claim 1, comprising said high priority data stream broadcast at a first signal quality value, said low priority data stream and said high priority data stream broadcast at a second signal quality value, such that an intermittency of reception less than said tolerance of signal interruption results in reception at the first signal quality value, and such that uninterrupted reception results in reception at the second signal quality value.

12. The method of claim 1, comprising:
modulating the high priority data stream using phase shift keyed modulation symbols; and
modulating the low priority data stream using phase shift keyed modulation symbols superimposed on a phase shift keyed constellation of said high priority data stream phase shift keyed modulation symbols.

13. A non-transitory machine readable medium containing instructions for performing the method of claim 1.

14. A processor containing instructions for performing the method of claim 1.

15. The processor of claim 14, comprising said processor provided as a monolithic integrated circuit.

16. The processor of claim 14, comprising said processor provided as a chipset.

17. The method of claim 1, in which the communication source is a satellite.

18. A method for receiving at least part of an original data stream, the original data stream having been divided according to a layered coding scheme into at least a high priority data stream and at least a low priority data stream, the high priority data stream transmitted as a first transmission and then as a second transmission, thereby providing a reliability factor for the high priority data stream for tolerance of signal interruption of a predetermined duration, the method comprising:
receiving a first transmission of the high priority data stream and a second transmission of the high priority data stream over a first virtual channel of a communication source;
attempting to receive a complete transmission of the low priority data stream over a second virtual channel while the first and second transmissions of the high priority data stream are received over the first virtual channel separate from the second virtual channel of the communication source;
if a complete transmission of the low priority data stream is received, decoding the high priority data stream and the low priority data stream according to the layered coding scheme to produce an output signal having a predetermined high quality value, and
if a complete transmission of the low priority data stream is not received, decoding the high priority data stream and producing an output signal from the decoded high priority data stream having a quality value lower than the predetermined high quality value.

19. The method of claim 18, the method further comprising:
if a complete transmission of the low priority data stream is received, decoding the low priority data stream with error correction coding provided with the low priority data stream; and
if a complete transmission of the high priority data stream is received, decoding the high priority data stream with error correction coding provided with the high priority data stream.

20. A non-transitory machine readable medium containing instructions for performing the method of claim 18.

21. A processor containing instructions for performing the method of claim 18.

22. The processor of claim 21, comprising said processor provided as a chipset.

23. An apparatus for providing partial signal redundancy in a transmission of an original data stream divided according to a layered coding scheme into at least a high priority data stream and a low priority data stream, the apparatus comprising:
a layered coding circuit configured to divide the original data stream according to the layered coding scheme into at least the high priority data stream and the low priority data stream and further configured to encode the high priority data stream so as to permit decoding of the high priority data stream independently of the low priority data stream; and
a transmitting circuit configured to broadcast a first transmission of said high priority data stream over a first virtual channel of a communication source and to broadcast a first portion of said low priority data stream over a second virtual channel separate from the first virtual channel, and to subsequently-rebroadcast a second transmission of said high priority data stream over the first virtual channel while broadcasting a second portion of the low priority data stream over the second virtual channel from the communication source, said transmitting circuit providing a reliability factor for the high priority data stream for tolerance of signal interruption of a predetermined duration by said first and second transmissions of the high priority data stream without retransmission of the low priority data stream.

24. The apparatus of claim 23, further comprising:
an error coding circuit configured to provide said first and second transmissions of said high priority data stream with an error correction code capable of decoding the respective transmission,
said error coding circuit configured to provide said first and second portions of said low priority data stream with an error correction code capable of decoding the combined portions of the data stream.

25. The apparatus of claim 23, comprising:
a modulator configured to modulate the high priority data stream using phase shift keyed modulation symbols, and to modulate the low priority data stream using phase shift keyed modulation symbols superimposed on a phase shift keyed constellation of said high priority data stream phase shift keyed modulation symbols.

26. An apparatus for receiving a transmission of an original data stream divided according to a layered coding scheme into at least one of a high priority data stream and a low priority data stream, the apparatus comprising:
a receiving circuit configured to receive at least one of a first transmission of the high priority data stream over a first virtual channel of a communication source and a second transmission of the high priority data stream over the first virtual channel and further configured to attempt to receive a complete transmission of the low priority data stream over a second virtual channel while the first and second transmissions of the high priority data streams are received over the first virtual channel separate from the second virtual channel of the communication source;
a decoding circuit configured to decode said high priority data stream and said low priority data stream according to the layered coding scheme if a complete transmission of the low priority data stream is received, and configured to decode the high priority data stream if a complete transmission of the low priority data stream is not received; and
an output circuit configured to produce an output signal having a predetermined high quality value if a complete transmission of the low priority data stream is received and configured to produce an output signal from the decoded high priority data stream alone having a lower quality value if a complete transmission of the low priority data stream is not received.

27. The apparatus of claim 26, the apparatus further comprising:
an error correcting circuit configured to decode the low priority data stream with error correction coding provided with the low priority data stream if a complete transmission of the low priority data stream is received, and configured to decode the high priority data stream with error correction coding provided with the high priority data stream if a complete transmission of the high priority data stream is received.

28. A system for providing partial signal redundancy, the system comprising:
means for encoding an original data stream into at least a high priority data stream and a low priority data stream;
means for encoding the high priority data stream so as to permit decoding of the high priority data stream independently of the low priority data stream; and
means for providing a reliability factor for the high priority data stream for tolerance of signal interruption of a predetermined duration by:
means for broadcasting a first transmission of the high priority data stream over a first virtual channel of a communication source and then means for rebroadcasting a second transmission of the high priority data stream over the first virtual channel, and
means for simultaneously broadcasting the low priority data stream over a second virtual channel while the first and second transmissions of the high priority data stream are broadcast over the first virtual channel separate from the second virtual channel of the communication source.

* * * * *